(12) United States Patent
Porter

(10) Patent No.: US 6,578,692 B2
(45) Date of Patent: Jun. 17, 2003

(54) REAR DRIVE MODULE FOR ALL-WHEEL DRIVE VEHICLE

(75) Inventor: Fred C. Porter, Beverly Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/023,001

(22) Filed: Dec. 17, 2001

(65) Prior Publication Data
US 2002/0139634 A1 Oct. 3, 2002

Related U.S. Application Data
(60) Provisional application No. 60/279,088, filed on Mar. 27, 2001.

(51) Int. Cl.[7] .................. F16H 48/12; F16D 43/284
(52) U.S. Cl. .............. 192/103 F; 74/650; 192/87.12; 192/87.13; 192/82 T
(58) Field of Search .................. 192/87.12, 87.13, 192/103 F, 82 T; 74/650; 475/88

(56) References Cited

U.S. PATENT DOCUMENTS

| | | | |
|---|---|---|---|
| 4,650,028 A | | 3/1987 | Eastman et al. |
| 5,353,889 A | * | 10/1994 | Hamada ................. 180/242 |
| 5,595,214 A | * | 1/1997 | Shaffer et al. ............. 475/85 |
| 5,699,888 A | | 12/1997 | Showalter |
| 5,827,145 A | * | 10/1998 | Okcuoglu ................. 475/88 |
| 5,938,556 A | | 8/1999 | Lowell |
| 5,964,126 A | * | 10/1999 | Okcuoglu ................. 74/650 |
| 6,095,939 A | * | 8/2000 | Burns et al. ............... 475/88 |
| 6,112,874 A | * | 9/2000 | Kopp et al. ............ 192/85 AA |
| 6,145,644 A | * | 11/2000 | Mohan et al. .......... 192/103 F |
| 6,155,947 A | | 12/2000 | Lowell |

* cited by examiner

Primary Examiner—Rodney H. Bonck
(74) Attorney, Agent, or Firm—Harness, Dickey & Pierce P.L.C.

(57) ABSTRACT

An automated multi-speed transmission includes an engine clutch operable to establish a releasable drive connection between the engine and an input shaft, an output shaft adapted to transfer power to the driveline, and a synchromesh geartrain having a plurality of constant-mesh gearsets that can be selectively engaged to establish a plurality of forward and reverse speed ratios. The transmission also includes power-operated dog clutches for selectively engaging the constant-mesh gearsets, and a controller for controlling coordinated actuation of the engine clutch and the power-operated dog clutches. The power-operated dog clutch associated with the low and the top gear are used during downshifts and upshifts, respectively, to actuate a clutch assembly for synchronizing the speed of the input shaft and the selected gear prior to engagement of its corresponding dog clutch.

9 Claims, 5 Drawing Sheets

REAR DRIVE MODULE FOR ALL-WHEEL DRIVE VEHICLE

CROSS-REFERENCE TO RELATED APPLICATIONS

This application claims the benefit of U.S. Provisional Application No. 60/279,088, filed Mar. 27, 2001.

FIELD OF THE INVENTION

The present invention relates generally to hydraulic couplings for use in motor vehicle driveline applications for limiting slip and transferring torque between rotary members. More specifically, a drive axle assembly for an all-wheel drive vehicle is disclosed having a pair of hydraulic couplings each having a fluid pump, a multi-plate clutch assembly, and a fluid distribution system operable to control actuation of the clutch assembly.

BACKGROUND OF THE INVENTION

In all-wheel drive vehicles, it is common to have a secondary drive axle that automatically receives drive torque from the drivetrain in response to lost traction at the primary drive axle. In such secondary drive axles it is known to provide a pair of clutch assemblies connecting each axleshaft to a prop shaft that is driven by the drivetrain. For example, U.S. Pat. No. 4,650,028 discloses a secondary drive axle equipped with a pair of viscous couplings while U.S. Pat. Nos. 5,964,126, 6,095,939 and 6,155,947 each disclose a secondary drive axle with a pair of pump-actuated multi-plate clutch assemblies. In addition to these passively-controlled drive axles, U.S. Pat. No. 5,699,888 teaches of a secondary drive axle having a pair of multi-plate clutches actuated by electromagnetic actuators that are controlled by an electronic control system.

SUMMARY OF THE INVENTION

An object of the present invention is to provide a drive axle assembly equipped with a pair of hydraulic couplings which are operably arranged for coupling a vehicle drivetrain to a pair of axleshafts.

In carrying out the above object, the drive axle assembly of the present invention includes a drive case that is rotatably supported within a housing and driven by the drivetrain, first and second output shafts rotatably supported by the drive case, and first and second hydraulic couplings operably installed between the drive case and the first and second output shafts. Each hydraulic coupling includes a multi-plate clutch assembly and a clutch actuator. The clutch actuator includes a fluid pump and a piston assembly. Each fluid pump is operable for pumping fluid in response to a speed differential between the drive case and the corresponding output shaft. The piston assembly includes a piston retained for sliding movement in a piston chamber and a multi-function control valve. The fluid pump supplies fluid to the piston chamber such that a clutch engagement force exerted by the piston on the multi-plate clutch assembly is proportional to the fluid pressure in the piston chamber. The control valve is mounted to the piston and provides a pressure relief function for setting a maximum fluid pressure within the piston chamber. The control valve also provides a thermal unload function for releasing the fluid pressure within the piston chamber when the fluid temperature exceeds a predetermined temperature value.

In accordance with an optional construction, the multi-function control valve of the present invention can also provide a flow control function for regulating the fluid pressure in the piston chamber. The flow control function can further include a thermal compensation feature for accommodating viscosity variations in the fluid.

BRIEF DESCRIPTION OF THE DRAWINGS

Further objects, features and advantages of the present invention will become readily apparent from the following detailed specification and the appended claims which, in conjunction with the drawings, set forth the best mode now contemplated for carrying out the invention. Referring to the drawings:

DETAILED DESCRIPTION OF THE PREFERRED EMBODIMENTS

In general, the present invention is directed to a hydro-mechanical limited slip and torque transfer device, hereinafter referred to as a drive axle assembly, for use in connecting the drivetrain to a pair of axleshafts associated with a secondary driveline of an all-wheel drive vehicle. However, the drive axle assembly can also find application in other driveline applications including, but not limited to, limited slip differentials of the type used in full-time transfer cases and front-wheel drive transaxles. Furthermore, this invention advances the technology in the field of hydraulically-actuated couplings of the type requiring pressure relief and thermal unloading to prevent damage to the driveline components.

Figure 1:
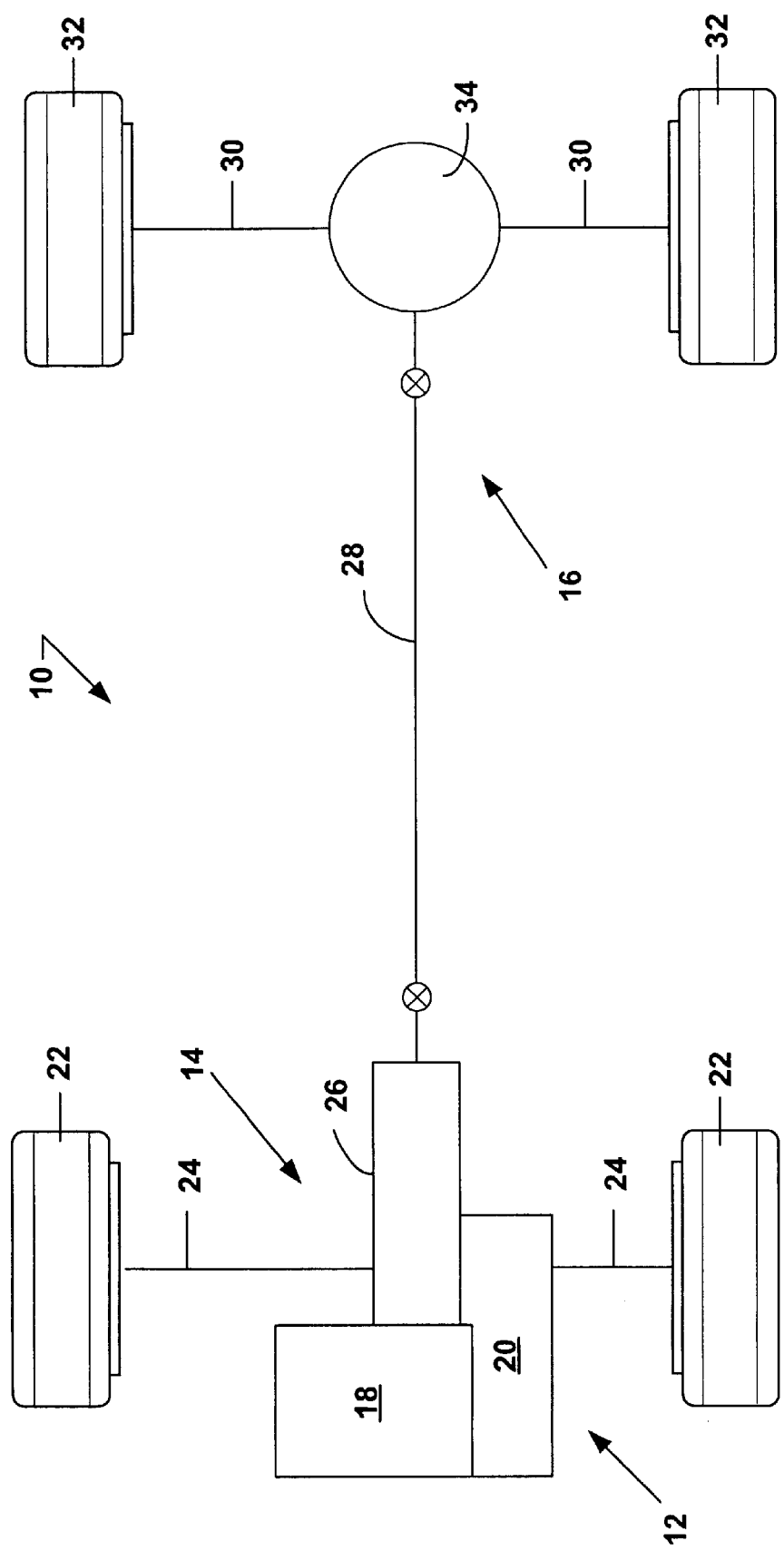
FIG. 1 is a schematic view of a motor vehicle drivetrain equipped with a secondary drive axle assembly constructed in accordance with the present invention.

With reference to FIG. 1, a schematic layout for a vehicular drivetrain 10 is shown to include a powertrain 12 driving a first or primary driveline 14 and a second or secondary driveline 16. Powertrain 12 includes an engine 18 and a transaxle 20 arranged to provide motive power (i.e., drive torque) to a pair of wheels 22 associated with primary driveline 14. Primary driveline 14 further includes a pair of halfshafts 24 connecting wheels 22 to a differential assembly (not shown) associated with transaxle 20. Secondary driveline 16 includes a power take-off unit (PTU) 26 driven by transaxle 20, a prop shaft 28 driven by PTU 26, a pair of axleshafts 30 connected to a pair of wheels 32, and a drive axle assembly 34 operable to transfer drive torque from propshaft 28 to one or both axleshafts 30.

Figure 2:
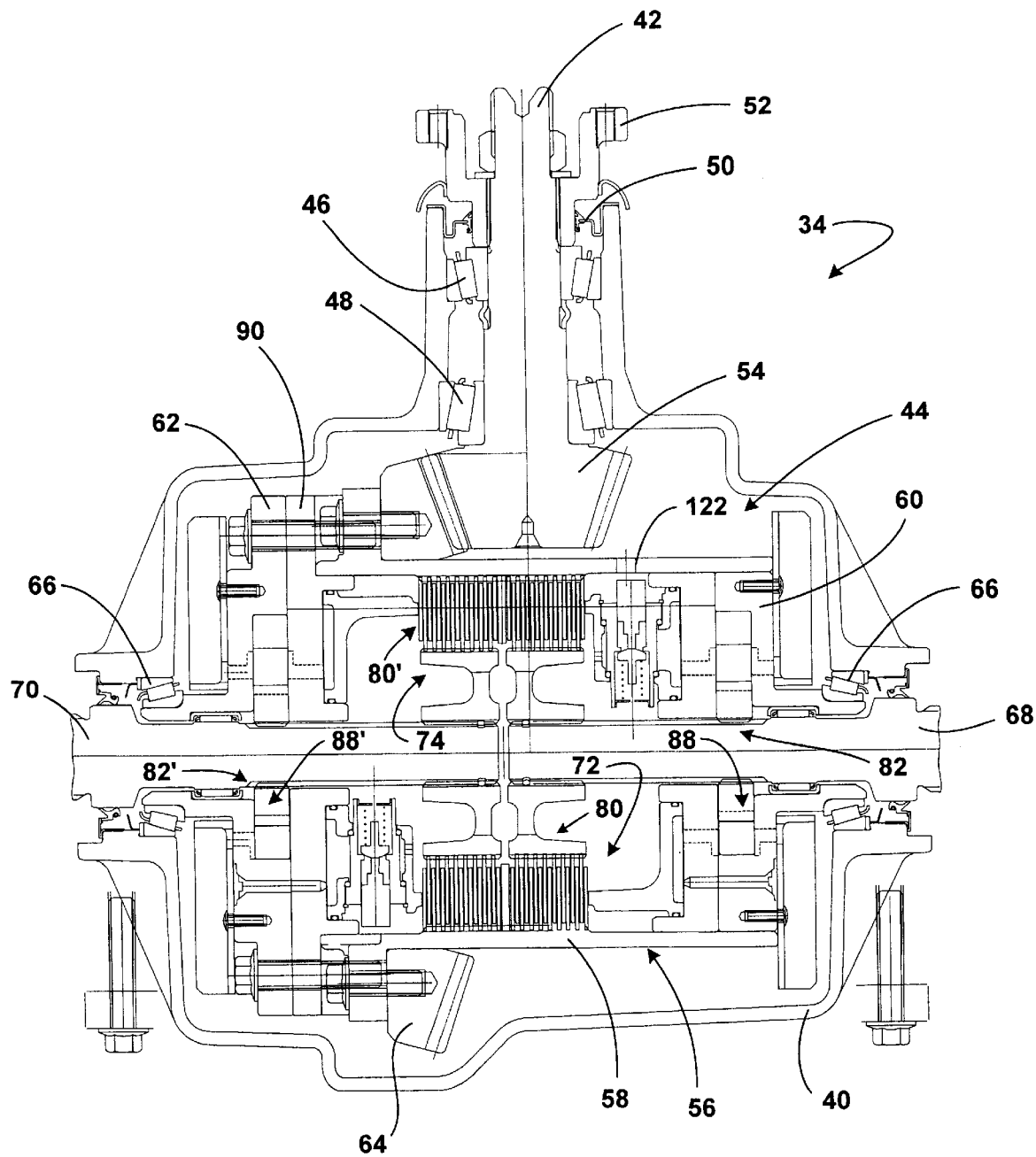
FIG. 2 is a sectional view of the secondary drive axle assembly.

Referring to FIG. 2, the components associated with drive axle assembly 34 will be now detailed. Drive axle assembly 34 includes a housing 40, a pinion shaft 42, and a differential assembly 44. Pinion shaft 42 is rotatably supported in housing 40 by bearing assemblies 46 and 48 and is sealed relative to housing 40 via a seal assembly 50. A yoke 52 is secured to pinion shaft 42 and is adapted for connection to prop shaft 28. A drive pinion 54 is formed at one end of pinion shaft 42. Differential assembly 44 includes a multipiece drive case 56 having a carrier drum 58 rigidly secured to a pair of end caps 60 and 62. A ring gear 64 is fixed (i.e., bolted) to drum 58 and is meshed with drive pinion 54 such that driven rotation of prop shaft 28 causes rotation of drive case 56. End caps 60 and 62 are shown supported for rotation relative to housing 40 by bearing assemblies 66.

Differential assembly 44 further includes first and second output shafts 68 and 70 adapted for connection to corresponding axleshafts 30, and first and second hydraulic couplings 72 and 74. First coupling 72 is operably connected between first output shaft 68 and drive case 56 while second hydraulic coupling 74 is operably connected between second output shaft 70 and drive case 56. First and second hydraulic couplings 72 and 74 are substantially identical in structure and function. As such, the remainder of this detailed description will be primarily directed to the construction and operation of first hydraulic coupling 72. However, common components for second hydraulic coupling 74 are identified in the drawings with primed common reference numerals.

Hydraulic coupling 72 includes a transfer clutch 80 and a clutch actuator 82. Transfer clutch 80 is a multi-plate clutch assembly including a clutch hub 84 fixed (i.e., splined) to first output shaft 68 and a clutch pack 86 of interleaved inner and outer clutch plates that are respectively splined to hub 84 and carrier drum 58. Clutch actuator 82 includes a fluid pump 88 disposed in a pump chamber formed between first end cap 60 and a piston housing 90, and a piston assembly 92 retained in an annular piston chamber 94 formed in piston housing 90. As seen, a bearing assembly 98 supports first end cap 60 for rotation relative to first output shaft 68.

Piston assembly 92 is supported for axial sliding movement in piston chamber 94 for applying a compressive clutch engagement force on clutch pack 86, thereby transferring drive torque and limiting relative rotation between drive case 56 and first output shaft 68. Similarly, piston assembly 921 of hydraulic coupling 74 functions to exert a clutch engagement force on clutch pack 861 for transferring torque and limiting slip between drive case 56 and second output shaft 70. The amount of torque transferred is progressive and is proportional to the magnitude of the clutch engagement force exerted by piston assembly 92 on clutch pack 86 which, in turn, is a function of the fluid pressure within piston chamber 94. Moreover, the fluid pressure generated by pump 88 and delivered to piston chamber 94 is largely a function of the speed differential between drive case 56 and first output shaft 68.

Figure 3:
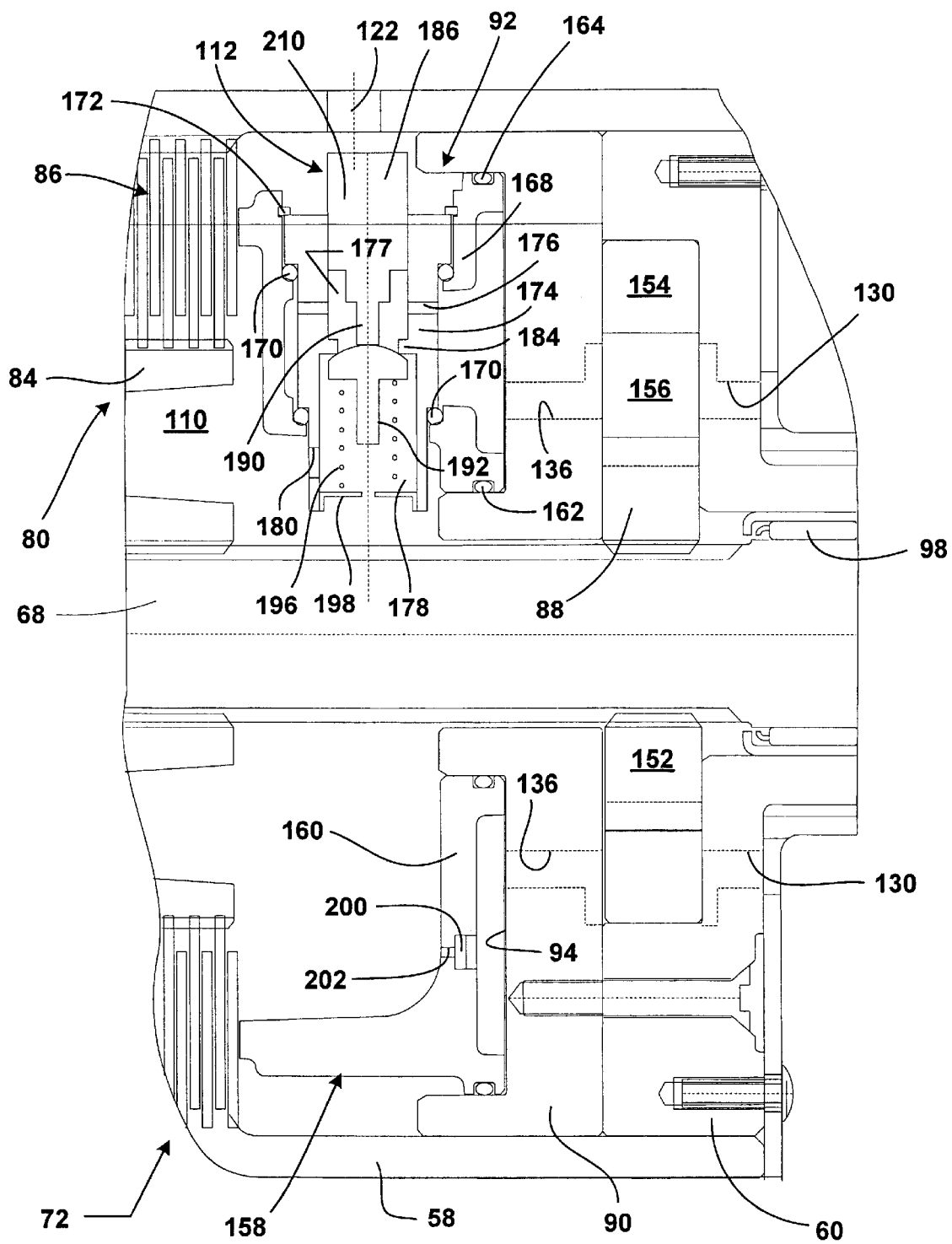
FIG. 3 is an enlarged partial view taken from FIG. 2 showing components of one of the hydraulic couplings in greater detail.
Figure 4:
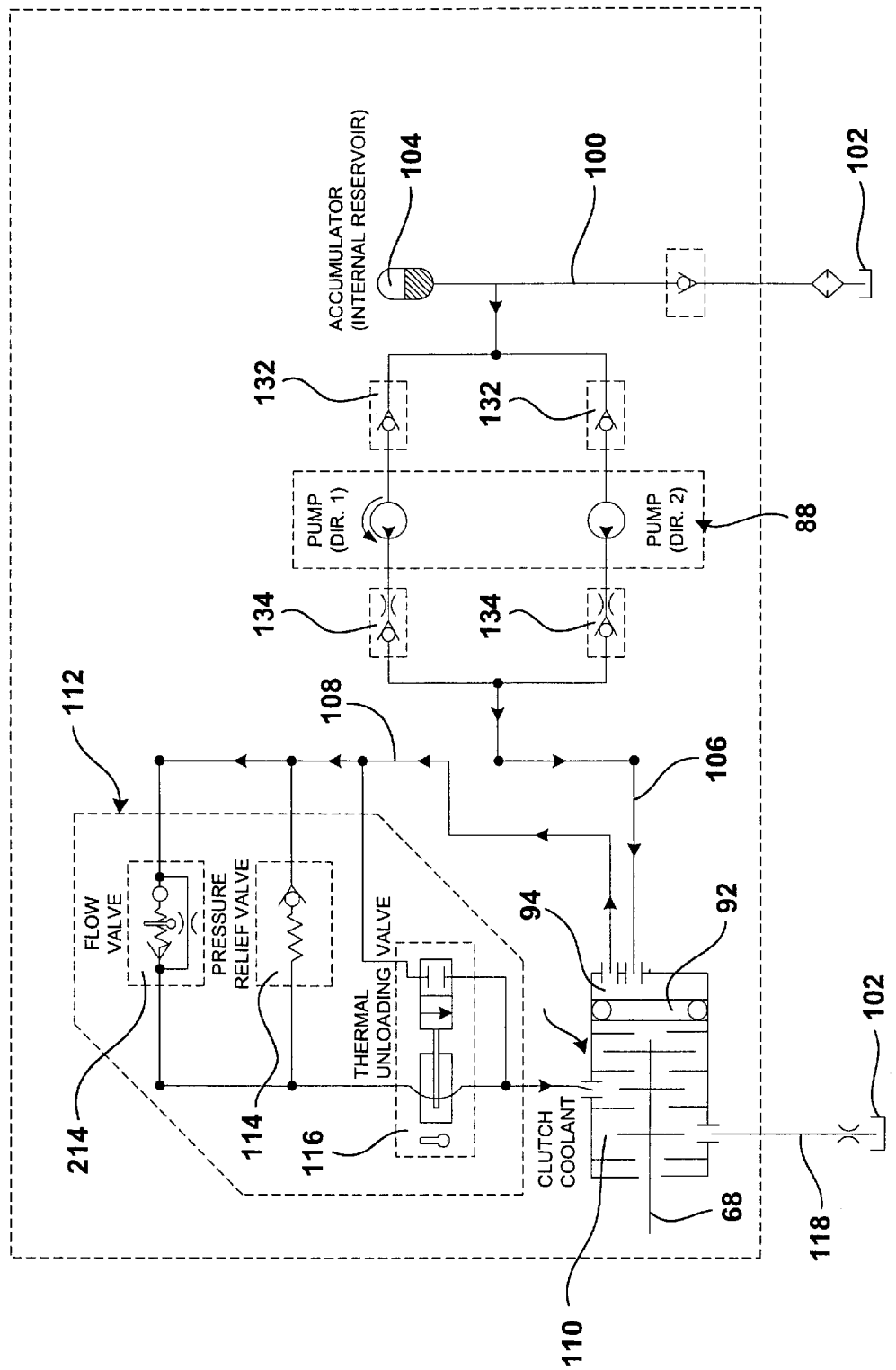
FIG. 4 is a schematic diagram illustrating a hydraulic control circuit associated with the secondary drive axle shown in FIG. 2.

With particular reference to FIGS. 3 and 4, a fluid distribution and valving arrangement is shown for controlling the delivery of fluid to piston chamber 94. The fluid distribution system includes a first flow path 100 for supplying hydraulic fluid from a sump 102 to an inlet reservoir 104 located at the inlet or suction side of fluid pump 88, and a second flow path 106 for supplying fluid from the discharge or outlet side of pump 88 to piston chamber 94. A third flow path 108 extends through piston assembly 92 for venting fluid from piston chamber 94 into a clutch chamber 110 in close proximity to clutch pack 86. A multi-function control valve 112 forms part of piston assembly 92 and provides at least two functional modes of operation. The first mode, hereinafter referred to as its pressure relief function, is schematically illustrated by a pressure relief valve 114. The second mode of operation, hereinafter referred to as its thermal unload function, is schematically indicated by a thermal unload valve 116. With each function, fluid discharged from piston chamber 94 is delivered to clutch chamber 110 for cooling clutch pack 86 and is then returned to sump 102 via a fourth flow path 118. According to the structure shown, exhaust ports 122 formed in drum 58 define fourth flow path 118.

First flow path 100 is defined by a pair of inlet ports 130 formed through first end cap 60. A One-way check valve 132 is provided for selectively opening and closing each of inlet ports 130. Specifically, one-way check valves 132 move between "open" and "closed" positions in response to the direction of pumping action generated by fluid pump 88. Rotation of the pump components in a first direction acts to open one of check valves 132 and to close the other for permitting fluid to be drawn from sump 102 into inlet reservoir 104. The opposite occurs in the case of pumping in the reverse rotary direction, thereby assuring bi-directional operation of pump 88. Check valves 132 are preferably reed-type valves mounted on rivets secured to first end cap 60. Check valves 132 are of the normally-closed type to maintain fluid within inlet reservoir 104.

A valving arrangement associated with second flow path 106 includes a second pair of one-way check valves 134 that are located in a pair of flow passages 136 formed in piston housing 90 between the outlet of pump 88 and piston chamber 94. As before, the direction of pumping action establish which of check valves 134 is in its "open" position and which is in its "closed" position to deliver pump pressure to piston chamber 94. Upon cessation of pumping action, both check valves 134 return to their closed position to maintain fluid pressure in piston chamber 94. Thus, check valves 134 are also of the normally-closed variety.

As noted, fluid pump 88 is operable for pumping hydraulic fluid into piston chamber 94 to actuate transfer clutch 80. Fluid pump 88 is bi-directional and is capable of pumping fluid at a rate proportional to speed differential between its pump components. In this regard, pump 88 is shown to include a gerotor pump assembly having a pump ring 152 that is fixed (i.e., keyed or splined) to first output shaft 68, an eccentric ring 154 that is mounted on first end cap 60, and a stator ring 156 that is operably disposed therebetween. Pump ring 152 has a plurality of external teeth that rotate concentrically relative to first output shaft 68 about a common rotational axis. Stator ring 156 includes a plurality of internal lobes and has an outer circumferential edge surface that is journally supported within a circular internal bore formed in eccentric ring 154. The internal bore is offset from the rotational axis such that, due to meshing of internal lobes of stator ring 156 with external teeth of pump ring 152, relative rotation between pump ring 152 and eccentric ring 154 causes eccentric rotation of stator ring 156. However, fluid pump 88 can be any type of mechanical pump capable of generating pumping action due to a speed differential.

Referring now to FIGS. 3 and 4, piston assembly 92 is shown to include a piston 158 and control valve 112. Piston 158 includes a radial web segment 160 sealed by seal rings 162 and 164 for movement relative to piston housing 90. Piston 158 further includes an axial rim segment 166 extending from web segment 160 and which engages clutch pack 86. Piston 158 further defines a cup segment 168 within which control valve 112 is retained. Seal rings 170 are provided to seal control valve 112 relative to cup segment 168 and a circlip 172 is provided to retain control valve 112 in cup segment 168. Control valve 112 includes a tubular housing 174 defining a series of inlet ports 176 communicating with a pressure chamber 177, and a valve chamber 178 having a series of outlet ports 180. Pressure chamber 177 and valve chamber 178 are delineated by a rim section 182 having a central valve aperture formed therethrough. A thermal actuator 186 is retained in pressure chamber 177 of housing 174 and includes a post segment 190 which extends through the valve aperture into valve chamber 178. A head segment of a valve member 192 is seated against the valve aperture. A spring 196 mounted between an end cap 198 and valve member 192 is operable to bias valve member 192 against the seat surface defined by the valve aperture for normally preventing fluid flow from inlet ports 176 to outlet ports 180. Control valve 112 is arranged such that inlet ports 176 communicate with piston chamber 94 with valve member 192 directly exposed to the fluid pressure in piston chamber 94.

Hydraulic coupling 72 includes a flow regulator 200 which is operable for setting the predetermined minimum pressure level within piston chamber 94 at which transfer clutch 80 is initially actuated and which is further operable to compensate for temperature gradients caused during heating of the hydraulic fluid. Preferably, flow regulator 200 is a reed-type valve member secured to piston assembly 92 such that its terminal end is normally maintained in an "open" position displaced from a by-pass port 202 formed through piston 158 for permitting by-pass flow from piston chamber 94 to clutch chamber 110. During low-speed relative rotation, the pumping action of fluid pump 88 causes fluid to be discharged from piston chamber 94 through by-pass port 202 into clutch chamber 110. Flow regulator 200 is preferably a bimetallic valve element made of a laminated pair of dissimilar metallic strips having different thermal coefficients of expansion. As such, the terminal end of the valve element moves relative to its corresponding by-pass port 202 regardless of changes in the viscosity of the hydraulic fluid caused by temperature changes. This thermal compensation feature can be provided by one or more bimetallic valves. However, once the fluid in piston chamber 94 reaching its predetermined pressure level, the terminal end of the bimetallic valve element will move to a "closed" position for inhibiting fluid flow through by-pass port 202. This flow restriction causes a substantial increase in the fluid pressure within piston chamber 94 which, in turn, causes piston 158 to move and exert a large engagement force on clutch pack 86. A bleed slot (not shown) is formed in one of by-pass port 202 or bimetallic valve element and permits a small amount of bleed flow even when the flow regulator is in its closed position for gradually disengaging transfer clutch 80 when fluid pump 88 is inactive.

The pressure relief function of control valve 112 occurs when the fluid pressure in piston chamber 94 is greater than that required to close bimetallic flow regulator 200 but less than a predetermined maximum value. In this pressure range, the bias of spring 196 is adequate to maintain valve member 192 seated against the aperture such that fluid is prevented from flowing from piston chamber 94 through outlet ports 180. However, when the fluid pressure in piston chamber 94 exceeds this maximum value, valve member 192 is forced to move in opposition to the biasing of spring 196. As such, fluid in piston chamber 94 is permitted to flow through the aperture into valve chamber 178 from where it is discharged from outlet ports 180. The fluid discharged from outlet ports 180 circulates in clutch chamber 110 to cool clutch pack 86 and is directed to flow across actuator section 210 of thermal actuator 186 prior to discharge to pump through exhaust ports 122 in drum 58. Use of this pressure relief function torque limits hydraulic coupling 72 and prevents damage thereto. The thermal unload function is actuated when the fluid temperature detected by actuator section 210 of thermal actuator 186 exceeds a predetermined maximum value. In such an instance, post segment 190 moves from its retracted position shown to an extended position for causing valve member 192 to move away from seated engagement against aperture (or maintain valve member 192 in its displaced position during pressure relief) and permit fluid in pressure chamber 92 to vent into clutch chamber 110, thereby releasing transfer clutch 80. Once piston chamber 94 has been unloaded, the fluid and thermal actuator 186 will eventually cool to a temperature below the predetermined value, whereby post segment 190 will return to its retracted position for resetting the thermal unload function. Thermal actuator 186 is of a type manufactured by Therm-Omega Tech of Warminster, Pa. or Standard-Thomson of Waltham, Mass.

Figure 5:
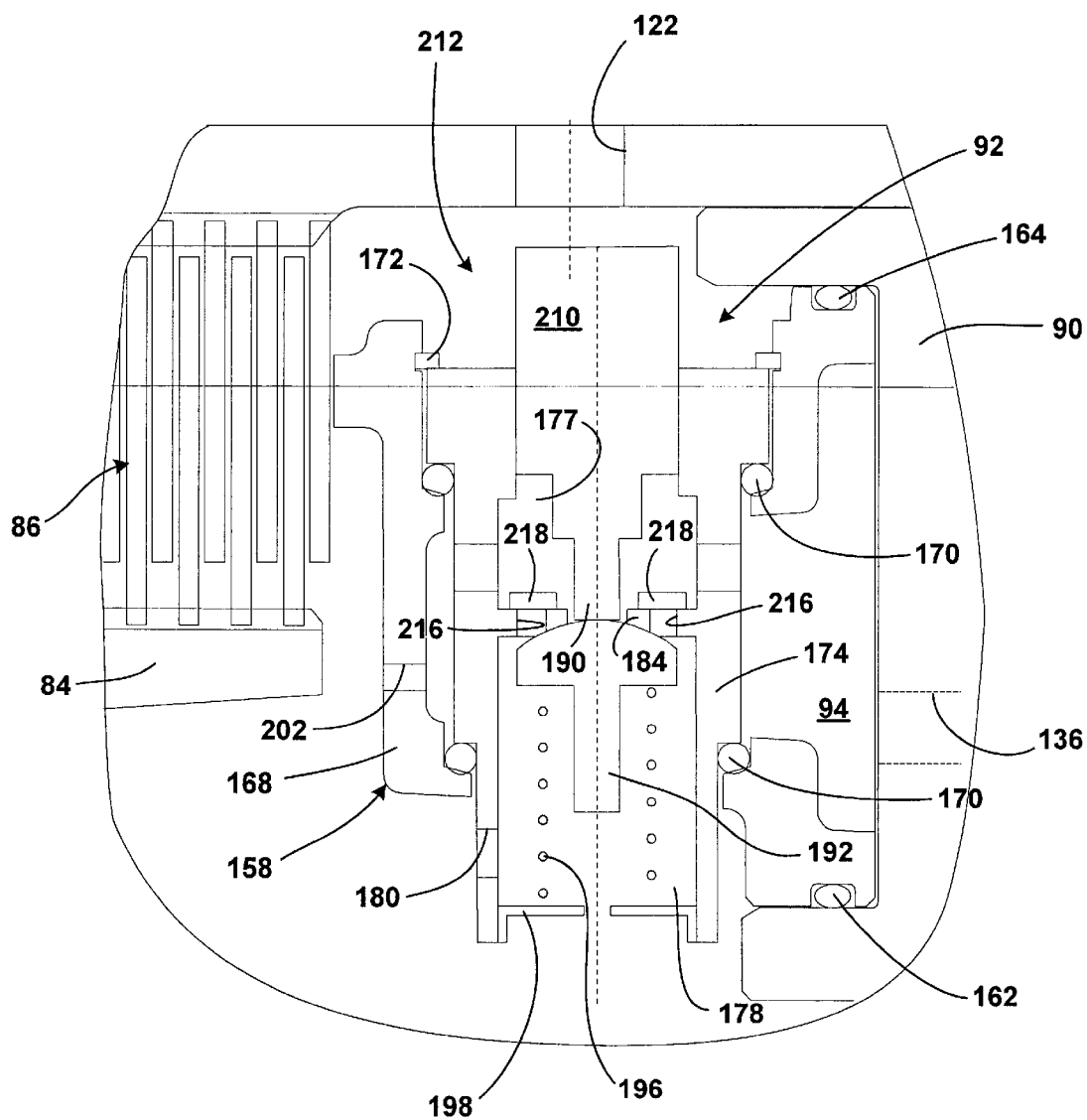
FIG. 5 is a sectional view of a multi-function control valve adapted for use with the hydraulic couplings of the secondary drive axle assembly.

Referring now to FIG. 5, an alternative construction for a control valve assembly 212 is shown. In general, control valve assembly 212 is substantially identical to control valve assembly 112 with the exception that it now provides a third functional mode of operation. Namely, control valve assembly now also provides a flow control function (shown schematically in FIG. 4 as flow control valve 214) in addition to its pressure relief and thermal unload functions. In particular, control valve assembly 212 includes one or more bimetallic valves 218 having one end fixed to housing 174 and a second end overlying a flow port 216 formed in rim section 184 of housing 174. Flow port 216 provides a flow path between inlet ports 176 and outlet ports 180. Bimetallic valve 218 is adapted to move from an open position displaced from flow port 216 based on the fluid pressure acting thereon. In operation, when the speed differential between drum 58 and first output shaft 68 is less than a certain actuation value, the pressure in piston chamber 94 permits the second end of bimetallic valve 218 to remain in its open position. However, when the speed differential exceeds the actuation valve, the fluid pressure causes the second end of bimetallic valve 218 to move to its closed position. Thus, flow through flow port 216 is inhibited and causes a substantial increase in fluid pressure within piston chamber 94 which, in turn, cases piston assembly 92 to exert a larger engagement force on clutch pack 86. Once relative rotation ceases, the bleed flow to clutch chamber 110 through the bleed slot functions to reduce the pressure in piston chamber 94 for disengaging transfer clutch 80 and permitting subsequent movement of bimetallic valve 218 to its open position.

As a further feather, bimetallic valve 218 is thermally compensating for accommodating temperature gradients caused during cyclical heating and cooling of the hydraulic fluid. More specifically, due to its construction of two metallic strips laminated together having different thermal expansion coefficients, the second end of bimetallic valve 218 is caused to move relative to flow port 216 as its temperature is varied for controlling flow through flow port 216 independent of changes in the viscosity of the hydraulic fluid caused by such temperature variations. In addition to being thermally-compensating, bimetallic valve 218 is also speed dependent for delaying engagement of transfer clutch 80 at higher vehicle speeds. Specifically, the spring function of bimetallic valve 218 provides a centrifugal effect for delaying movement of the second end of bimetallic valve 218 to its closed position as a function of increasing rotary speed. In this regard, the centrifugal effect caused by increasing rotary speed requires a higher flow rate to close bimetallic valve 218, whereby a greater speed differential is required to overcome the centrifugal resistance and move the second end of bimetallic valve 218 to its closed position.

Twin clutch drive axle 34 is operable to control interaxle slip between front driveline 14 and rear driveline 16 and is further adapted to control intra-axle slip between rear wheels 32. The application of a multi-purpose control valve 112 or 212 provides a significant advantage in that the valving required to perform the pressure relief, temperature unload and flow control functions is significantly simplified. Those skilled in the art will appreciate that variations can be made to the disclosed structure without extending beyond the scope of the proprietary drive axle described herein.

What is claimed is:

1. A drive axle assembly for transferring drive torque from a vehicle drivetrain to a pair of axleshafts, comprising:

a drive case driven by the drivetrain;

first and second output shafts rotatably supported by said drive case and adapted for connection to the axleshafts;

a first hydraulic coupling operably installed between said drive case and said first output shaft and including a multi-plate friction clutch, a fluid pump operable to pump fluid from a sump to a pressure chamber in response to speed differentiation between said drive case and said first output shaft, a piston retained in said pressure chamber to exert a clutch engagement force on said friction clutch proportional to the fluid pressure in said pressure chamber, and a control valve mounted to said piston, said control valve having a valve member moveable from a closed position to an open position when the fluid pressure in said pressure chamber exceeds a predetermined maximum pressure value for venting fluid to said sump, and a thermal actuator operable for moving said valve member from its closed position to its open position when the temperature of the fluid in said sump exceeds a predetermined maximum temperature level; and a second hydraulic coupling operably installed between said drive case and said second output shaft and including a multi-plate friction clutch, a fluid pump operable to pump fluid from said sump to a pressure chamber in response to speed differentiation between said drive case and said second output shaft, a piston retained in said pressure chamber to exert a clutch engagement force on said friction clutch in proportion to the fluid pressure in said pressure chamber, and a control valve mounted to said piston, said control valve having a valve member moveable from a closed position to an open position when the fluid pressure in said pressure chamber exceeds a predetermined maximum pressure value for venting fluid to said sump, and a thermal actuator operable for moving said valve member from its closed position to its open position when the temperature of the fluid in said sump exceeds a predetermined maximum temperature value.

2. The drive axle assembly of claim 1 wherein said drive case includes a carrier drum and first and second end caps, said fluid pump in said first hydraulic coupling is a gerotor pump having a first pump element fixed to said first output shaft and a second pump element rotatable with said first end cap.

3. The drive axle assembly of claim 1 wherein each of said first and second hydraulic couplings includes a first flow path for supplying hydraulic fluid from said sump to an inlet of said fluid pump, a second flow path for supplying high pressure fluid from an outlet of said fluid pump to said pressure chamber, a third flow path through said piston for venting fluid from said pressure chamber to a clutch chamber adjacent to said friction clutch which is opened and closed via movement of said valve member, and a fourth flow path for returning fluid in said clutch chamber to said sump.

4. The drive axle assembly of claim 3 wherein said piston includes a plate segment sealed relative to pressure chamber, a transverse rim segment engaging said friction clutch, and a cap segment formed between said plate segment and said rim segment within which control valve is retained.

5. The drive axle assembly of claim 4 wherein said control valve includes a tubular housing having an inlet port providing fluid communication between said pressure chamber and a first valve chamber and an outlet port providing fluid communication between said clutch chamber and a second valve chamber, said valve member located in said second valve chamber and is operable in its closed position to prevent fluid flow from said first valve chamber into said second valve chamber and further operable in its open position to permit fluid flow therebetween.

6. The drive axle assembly of claim 5 wherein said thermal actuator is located in said first valve chamber and has a moveable post member contacting said valve member and a temperature sensing portion located in said fourth flow path.

7. The drive axle assembly of claim 6 wherein a said tubular housing defines an aperture between said first and second valve chambers against which a head segment of said valve member is seated when said valve member is in its closed position, and a spring for biasing said valve member toward its closed position.

8. The drive axle assembly of claim 3 further comprising a flow regulator valve located in proximity to a by-pass port between said pressure chamber and said clutch chamber, said flow regulator is normally open to permit flow through said by-pass port and is moveable to a closed position when the fluid pressure in said pressure chamber exceeds a minimum pressure level.

9. An all-wheel drive vehicle comprising:

an engine;

a transaxle for transferring drive torque from said engine to a pair of front wheels;

a power take-off unit for transferring drive torque from said transaxle to a drive shaft;

a pair of rear wheels driven by first and second axleshafts; and a drive axle assembly for transferring drive torque from said drive shaft to said first and second axleshafts, said drive axle assembly including a drive case driven by said drive shaft, a first output shaft connected to said first axleshaft, a second output shaft connected to said second axleshaft, a first hydraulic coupling operably installed between said drive case and said first output shaft and including a first multi-plate friction clutch, a first pump operable to pump fluid from a sump to a first pressure chamber in response to speed differentiation between said drive case and said first output shaft, a first piston retained in said first pressure chamber to exert a clutch engagement force on said first friction clutch in proportion to the fluid pressure in said first pressure chamber, and a first control valve mounted to said first piston and having a first valve member moveable from a closed position to an open position when the fluid pressure in said first pressure chamber exceeds a predetermined maximum pressure value for venting fluid to said sump, and a first thermal actuator operable for moving said first valve member from its closed position to its open position when the temperature of the fluid in said sump exceeds a predetermined maximum temperature value, and a second hydraulic coupling operably installed between said drive case and said second output shaft including a second multi-plate friction clutch, a second pump operable to pump fluid from said sump to a second pressure chamber in response to speed differentiation between said drive case and said second output shaft, a second piston retained in said second pressure chamber to exert a clutch engagement force on said second friction clutch in proportion to the fluid pressure in said second pressure chamber, and a second control valve mounted to said second piston and having a valve member moveable from a closed position to an open position when the fluid pressure in said second pressure chamber exceeds a predetermined maximum pressure value for venting fluid to said sump, and a second thermal actuator operable for moving said second valve member from its closed position to its open position when the temperature of the fluid in said sump exceeds a predetermined maximum temperature value.

* * * * *